United States Patent
Alterman (10) Patent No.: US 8,819,070 B2
(45) Date of Patent: Aug. 26, 2014

(54) METHODS AND APPARATUS FOR INFORMATION ORGANIZATION AND EXCHANGE

(75) Inventor: Eric Alterman, Jupiter, FL (US)

(73) Assignee: Flow Search Corp., Jupiter, FL (US)

( * ) Notice: Subject to any disclaimer, the term of this patent is extended or adjusted under 35 U.S.C. 154(b) by 0 days.

(21) Appl. No.: 13/085,239

(22) Filed: Apr. 12, 2011

(65) Prior Publication Data

US 2011/0252066 A1   Oct. 13, 2011

Related U.S. Application Data

(60) Provisional application No. 61/323,177, filed on Apr. 12, 2010.

(51) Int. Cl.
*G06F 7/00* (2006.01)
*G06F 17/30* (2006.01)
*G06Q 30/02* (2012.01)

(52) U.S. Cl.
CPC ............ *G06F 17/3089* (2013.01); *G06Q 30/02* (2013.01)
USPC ............ 707/794; 707/795; 707/796; 707/805

(58) Field of Classification Search
CPC .......... G06F 17/2229; G06F 17/30707; G06F 17/30731; Y10S 707/99943; Y10S 707/99944; Y10S 707/99945; Y10S 707/99948
See application file for complete search history.

(56) References Cited

U.S. PATENT DOCUMENTS

| | | | |
|---|---|---|---|
| 7,266,491 B2* | 9/2007 | Humphreys et al. | 704/4 |
| 8,064,583 B1 | 11/2011 | Sutaria et al. | |
| 2005/0027512 A1* | 2/2005 | Waise | 704/9 |
| 2005/0091220 A1 | 4/2005 | Klemow | |
| 2005/0102260 A1 | 5/2005 | Spring et al. | |
| 2006/0265489 A1 | 11/2006 | Moore | |
| 2007/0033221 A1* | 2/2007 | Copperman et al. | 707/103 R |
| 2007/0078642 A1* | 4/2007 | Weng et al. | 704/4 |
| 2007/0106627 A1 | 5/2007 | Srivastava et al. | |
| 2008/0270481 A1 | 10/2008 | Augustine | |
| 2009/0055419 A1 | 2/2009 | Gibbon et al. | |
| 2010/0242085 A1 | 9/2010 | Dutta et al. | |
| 2011/0184718 A1* | 7/2011 | Chen | 704/2 |
| 2011/0296291 A1* | 12/2011 | Melkinov et al. | 715/229 |

FOREIGN PATENT DOCUMENTS

| | | |
|---|---|---|
| EP | 2386970 A1 | 11/2011 |
| WO | WO-2010062677 A2 | 6/2010 |

* cited by examiner

*Primary Examiner* — Binh V Ho
(74) *Attorney, Agent, or Firm* — Goodwin Procter LLP (57) ABSTRACT

Methods and apparatus for information organization and exchange by providing a data store of interconnected items of information that together form an intent-driven taxonomy. This allows users to easily discover and exchange real-time items of information across applications.

16 Claims, 8 Drawing Sheets

```
THE FLOW – APPICATION DIRECTORY
http://                                                   SEARCH
```

APPLICATION FLOWS
NAME: INCOMING RATING
PATH: /APPS/COFFEERATE/INCOMING_RATINGS

IDENTITY FLOWS
NAME: YOUR RECOMMENDATIONS
PATH: RECOMMENDATIONS
DESCRIPTION: COFFEE YOU MAY LIKE

| DROP ELEMENTS: | | | |
|---|---|---|---|
| NAME | CLASS | DESCRIPTION | REQUIRED |
| THIS USER FLOW HAS NO DROP ELEMENTS | | | |

NAME: FAVORITE COFFEE RATINGS
PATH: FAVORITES
DESCRIPTION: YOUR FAVORITE RATINGS

| DROP ELEMENTS: | | | |
|---|---|---|---|
| NAME | CLASS | DESCRIPTION | REQUIRED |
| THIS USER FLOW HAS NO DROP ELEMENTS | | | |

NAME: COFFEE RATINGS
PATH: RATINGS
DESCRIPTION: ALL OF YOUR RATINGS

| DROP ELEMENTS: | | | |
|---|---|---|---|
| NAME | CLASS | DESCRIPTION | REQUIRED |
| TITLE | STING | RATING TITLE | TRUE |
| DESCRIPTION | STRING | DESCRIBE THE COFFEE... | FALSE |
| ACIDITY | INTEGER | RATE THE ACIDITY | FALSE |
| BITTERNESS | INTEGER | RATE THE BITTERNESS | FALSE |

APPLICATION TRACKS
THERE ARE CURRENTLY NO APPLICATION TRACKS FOR THIS APPLICATION

IDENTITY TRACKS
SOURCE FLOW: RATINGS
DESINATION FLOW: /APPS/COFFEERATE/INCOMING_RATINGS
FILTER: UNFILTERED

*FIG. 8*

METHODS AND APPARATUS FOR INFORMATION ORGANIZATION AND EXCHANGE

CROSS-REFERENCE TO RELATED APPLICATION

This application claims priority to and the benefit of, and incorporates herein by reference in its entirety, U.S. Provisional Patent Application No. 61/323,177, which was filed on Apr. 12, 2010.

FIELD OF THE INVENTION

The present invention relates generally to methods and apparatus for information organization and exchange, and in particular to the organization and exchange of items of information in a taxonomy.

BACKGROUND OF THE INVENTION

The information available from individuals and enterprises has grown dramatically in both complexity and volume in recent years. As a consequence, it is increasingly difficult to provide and organize this ever-growing wealth of information. To address this, a multitude of tools have been developed to organize information, e.g., hashtags, hyperlinks, distributed file systems, etc.

While these tools may provide users with a large database of information, they are limited in functionality and scalability. For example, several of the platforms merely provide the users with a pool of unorganized and broad tags which users must manually search. Other platforms only allow users to discover information based on the source of the information. Overall, these platforms do not provide a manner in which users of the system may easily discover arbitrarily-defined pools of information as soon as the information is published. The users' ability to find particular items of information on these platforms becomes more frustrated as the amount and complexity of information expands over time. This is especially challenging for some platforms that require the manual tagging of information before that information is made available to users.

Accordingly, there is a need for improved methods and apparatus for information organization and exchange that allow users to easily discover and share real-time sets of arbitrarily-organized information across applications.

SUMMARY OF THE INVENTION

Embodiments of the present invention provide methods and apparatus for information organization and exchange by providing a data store of interconnected items of information that together form an intent-driven taxonomy. This allows users to easily discover and exchange real-time items of information across applications. Embodiments of the present invention allow publishers of any content type to connect with potential subscribers to that particular content.

In one aspect, embodiments of the present invention provide an apparatus for organizing information comprising a data store, a receiver interface and a transmitter interface. The data store includes a plurality of interconnected items of information, where each item of information is associated with at least one item of meta-information. The receiver interface of the apparatus is adapted to receive at least one item of information associated with at least one item of meta-information and to add this item of information to the data store. In addition, the transmitter interface is adapted to traverse items of meta-information and to provide associated items of information to a receiver external to the data store. The items of information that are in the data store form a taxonomy with root entries in the taxonomy associated with verbs and lower level entries in the taxonomy associated with descriptors or nouns associated with higher level entries in the taxonomy.

In one embodiment of the present invention, the data store processes an item of information to identify an interconnected item of information and provides the interconnected item to a receiver external to the data store. In another embodiment, the apparatus further include a syndication mechanism for receiving information and meta-information from the receiver interface and subsequently providing the received information and meta-information to at least one external receiver (such as an application, a user of an application, etc.) utilizing the transmitter interface. Each item of information in these apparatus may also be associated with at least one permission. In a further embodiment, the receiver external to the data store makes the information it receives available to a second receiver external to the data store.

In additional embodiments of the present invention, the apparatus further includes a republisher that copies at least part of a first item of information in the data store to a second item of information in the data store based on a predefined rule. The predefined rule may include at least one criterion selected from the group consisting of a source location, a destination location, and at least one characteristic for testing the information. The republisher may copy the information upon the addition of the first item of information to the data store. In addition, in the course of copying, the republisher of one embodiment may transform the information.

In still another embodiment of the present invention, the apparatus comprises at least one additional data store that includes a plurality of interconnected items of information and where each item of information is associated with at least one item of meta-information. In one embodiment, at least one item of information in the data store is connected with at least one item of information in at least one additional data store.

In another aspect, embodiments of the present invention provide a method for organizing information and include, first, a step of providing a data store comprising of a plurality of interconnected items of information where each item of information is associated with at least one item of meta-information. The plurality of items forms a taxonomy where the root entries in the taxonomy are associated with verbs and the lower level entries in the taxonomy are associated with descriptors or nouns associated with higher level entries in the taxonomy. The method further includes the steps of receiving at least one item of information associated with at least one item of meta-information; and storing the received information and meta-information in the data store.

In certain embodiments, the methods further include processing an item of information to identify an associated item of information and providing the associated item to a receiver external to the data store (such as an application, a user of an application, etc.). Other embodiments further comprise a step of syndicating the received information and meta-information to at least one external receiver. Each item of information in the data store may also be associated with at least one permission. In a further embodiment, the receiver external to the data store makes the information it receives available to a second receiver external to the data store.

In still another embodiment, the methods further include copying at least part of a first item of information in the data store to a second item of information in the data store based on a predefined rule. The predefined rule in some of these methods may include least one criterion selected from the group consisting of a source location, a destination location, and at least one characteristic for testing the information. The copying, for example, may occur upon the addition of the first item of information to the data store. The information, also, may be transformed in the course of copying the information in some embodiments.

In yet another embodiment, the methods further includes the step of providing at least one additional data store comprising a plurality of interconnected items of information where each item of information associated with at least one item of meta-information. Furthermore, at least one item of information in the data store may be connected with at least one item of information in at least one additional data store.

The foregoing and other features and advantages of the present invention will be made more apparent from the description, drawings, and claims that follow.

BRIEF DESCRIPTION OF DRAWINGS

The present invention will now be described, by way of example only, with reference to the accompanying Figures, in which.

DETAILED DESCRIPTION OF THE INVENTION

Embodiments of the present invention provide methods and apparatus for information organization and exchange. Standard programming and engineering techniques may be used to produce embodiments including software, firmware, hardware, or any combination thereof to implement the disclosed subject matter. Exemplary embodiments are shown in detail in the accompanying Figures.

Figure 1:
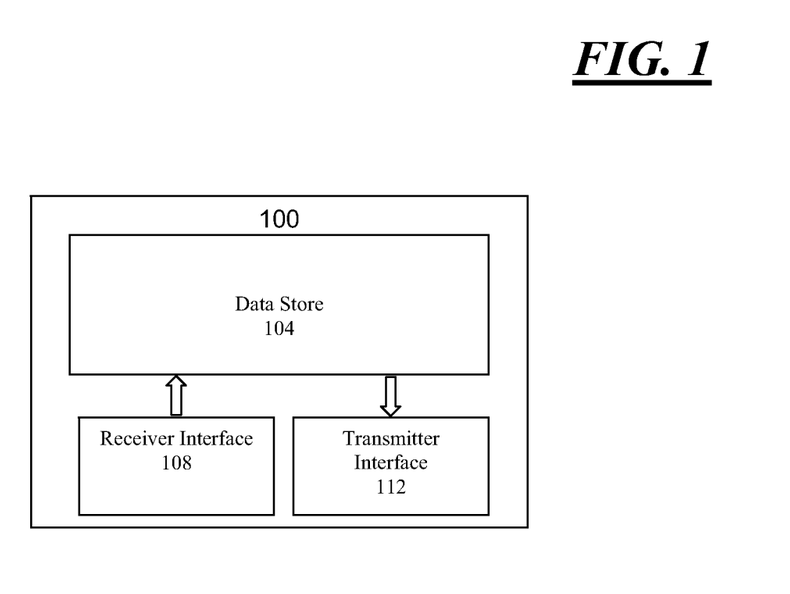
FIG. 1 illustrates an example of a data store in accord with the present invention.

Referring initially to FIG. 1, a block diagram of an apparatus 100 implementing one embodiment of the invention is shown containing a data store 104, a receiver interface 108 and a transmitter interface 112.

The data store 104 may be embodied in a server, a database, a hard drive, an external hard drive or other forms of computer data storage. The data store 104, for example, may also be any volatile memory or nonvolatile memory, or both. A nonvolatile-memory data store 104 may consist of read only memory (ROM), programmable ROM (PROM), electrically programmable ROM (EPROM), electrically, erasable programmable ROM (EEPROM), or flash memory. In the alternate or in addition, a data store 104 may include volatile memory such as random access memory (RAM). RAM may take several forms, including static RAM (SRAM), dynamic RAM (DRAM), synchronous DRAM (SDRAM), double data rate SDRAM (DDR SDRAM), or other advanced forms of RAM known by one of ordinary skill in the art such as enhanced SDRAM (ESDRAM). The data store 104 of the apparatus is intended to comprise, without being limited to, these and any other suitable types of memory. One of ordinary skill would understand that a chosen form of storage for the data store 104, such as a hard drive, need not be used exclusively for the data store 104 but, rather, may contain other data, information, or programs related or unrelated to the operation of the present invention.

At least some of the information in the data store is received by way of receiver interface 108 in the apparatus 100. As further discussed below, the receiver interface 108 may be any device known by one of ordinary skill in the art to have the capability to receive at least one item of information associated with at least one item of meta-information and provide it to the data store. The receiver interface 108 may be any hardware, software, firmware or combination thereof capable of receiving items of information. For example, the receiver interface may comprise a keyboard, touch screen, or other data entry device. Alternatively, the receiver interface 108 may also accept data from a nonvolatile memory device such as a flash memory drive, an external hard drive, or a data connection to a data source. A receiver interface 108 may also be a network interface operating using any implementation of protocols or other features to support communication utilising a network, as described in further detail in connection with FIG. 2.

Just as information in the data store 104 may be received via receiver interface 108, items of information may be provided from the data store 104 via transmitter interface 112. The transmitter interface 112 may be any hardware, software, firmware or combination thereof capable of transmitting items of information including associated meta-information. In one embodiment, the transmitter interface 112 is capable of traversing items of meta-information and providing the associated items of information to a receiver external to the data store 104 using, e.g., technologies such as Representational State Transfer (REST) and Extensible Message and Presence Protocol (XMPP).

As will be further discussed in connection with FIG. 3 below, the transmitter interface may operate using any implementation of protocols or other features to support communication utilizing a network. This network may or may not be the same network in communication with the receiver interface 108. The data store 104 may be accessed locally or, as will be later described with reference to FIG. 3, the data store 104 may be accessed remotely.

The data store 104 comprises a plurality of interconnected items of information. Each item of information has any number of required or optional fields. As an example, a sales advertisement for a 1973 Pontiac Firebird may be an item of information in the data store 104. The advertisement may contain the seller's contact information, the price of the car, the condition of the car, and other relevant information. The contents of the items of information are not limited to text or numerical information, but may also include media data such as video data, audio data or executable programs. A data store 104 may contain a plurality of types or categories of information. For example, in one embodiment, the data store 104 may contain every item of information available on the public internet. However, the use of the present invention in certain environments may naturally result in data stores that only contain information limited to certain types or categories. For example, when an embodiment of the present invention is used in a laboratory environment, the data store 104 may only contain information, e.g., about test and lab results. Alternatively, when an embodiment of the present invention is used in a business environment, the data store 104 may only contain, e.g., information about a company's sales, assets, and revenue.

Though such limited use is not required by the present invention, in one embodiment, the apparatus has the capability to associate permissions with one or more items of information entered into the data store. The permission may determine whether the information is viewable by, e.g., the public, by certain groups of people, by invitation-only or by no one except the owner of the item of information. A permission may also restrict whether the information may be received or transmitted from the data store to an external receiver and whether the information is viewable remotely. Permissions may also allow for, e.g., the commercial sale of subscriptions or access to syndicated data feeds.

Embodiments of the present invention may contain multiple data stores, with each data store in the embodiment containing different types or categories of information. Such embodiments containing multiple data stores may be used for a wide variety of reasons beyond categorical separation, including security, speed, or data loss prevention. Further, the data stores, though separate, may operate jointly. An item of information of one data store 104, for example, may be connected with another item of information in another data store 104'. This allows items of information to be separated across multiple data stores but still transparently accessible where needed. For example, a plurality of data stores, each data store associated with a clinical test, may each contain a plurality of items of information, each item of information associated with a single patient in a single clinical test. When the same patient is the subject of multiple clinical tests, and therefore associated with multiple items of information in multiple data stores, the items of information may be interconnected across data stores to allow for the study of clinical test results associated with a particular patient.

Each item of information in the data store 104 is associated with at least one item of meta-information. This meta-information may also be stored in the data store 104. As one of ordinary skill in the art would appreciate, meta-information is information concerning at least one aspect of a particular item of information. By way of example and not for limiting purposes, meta-information may describe the item of information's time and date of creation, the creator of the item of information, the source of the item of information, the means of creation of the item of information, and any standards applicable to the item of information.

In addition, meta-information may simply describe the purpose or category of the item of information. In the preceding example of a Pontiac Firebird for sale, the item of information comprising the advertisement itself may be associated with a plurality of meta-information including "Pontiac," "Firebird," "1973," "car," the contact information of the seller, and "sale." The meta-information may be associated automatically with particular items of information. Embodiments of the data store 104 may have the capability to identify important meta-information associated with each item of information based on the content of the item of information, meta-information associated with similar items of information, predetermined programming, predetermined rules, or any other techniques known by one of ordinary skill in the art to determine the meta-information for an item of information. The item of information may also be manually associated with meta-information. In such an embodiment, when information is added to the data store, then the associated meta-information is also entered.

The interconnected items of information in the data store 104 collectively form an information taxonomy. The root entries in the taxonomy are associated with verbs, such as "Buy," "Find," "Volunteer," "Promote," "Request," and so on. This structure allows for items of information to be grouped, at the highest level, based on action words. The lower level entries in the taxonomy are associated with descriptors or nouns, and these lower level entries are connected to higher level entries in the taxonomy and, optionally, to other lower level entries. As a result, the scope of each item of information associated with the taxonomy is more specific as the taxonomy is traversed from higher to lower levels. In a further embodiment, lower level entries in the taxonomy are associated with nouns and even lower level entries in the taxonomy are associated with adjectives. Further, using action words as root entries allow the users of the system to filter the information in the data store based on what the user is intending to do. This taxonomy allows for large amounts of information to be arbitrarily grouped, manipulated, and traversed in a straightforward and efficient fashion, regardless of how and where the apparatus is used.

Figure 2:
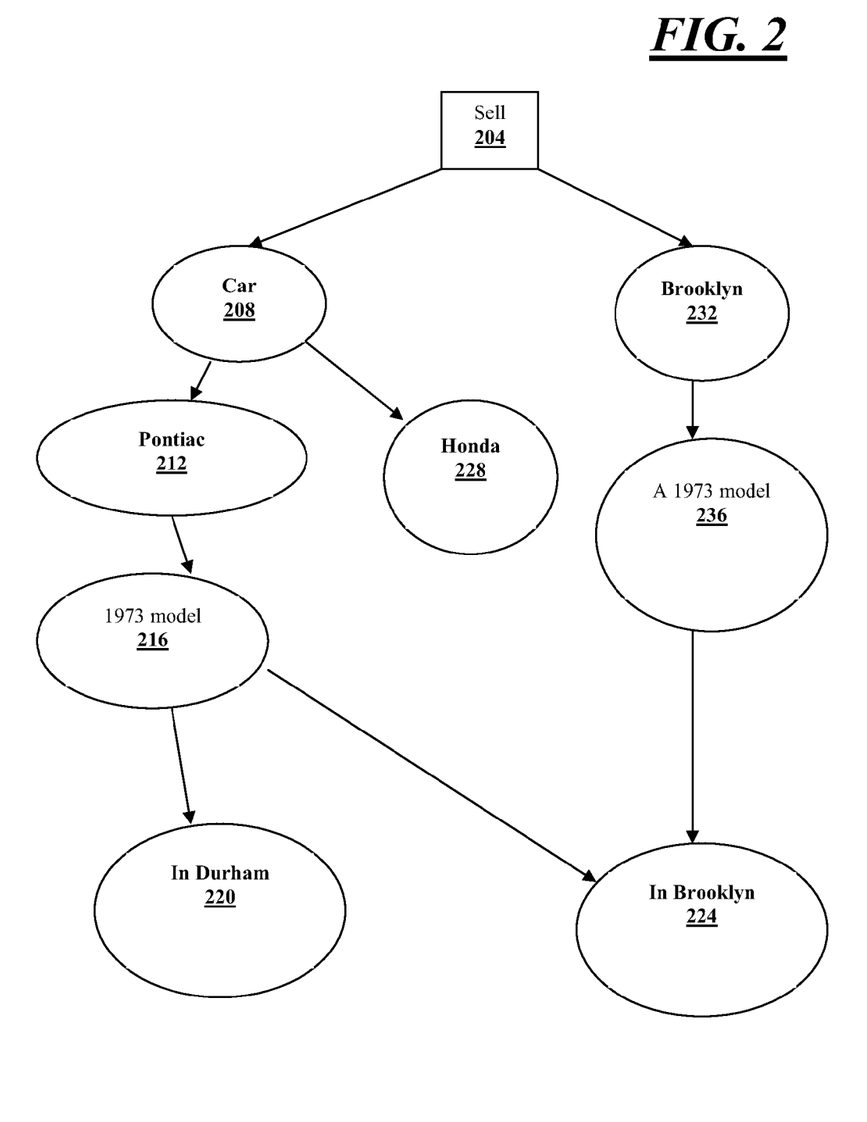
FIG. 2 depicts an exemplary information taxonomy in accord with the present invention.

By way of example, FIG. 2 depicts an exemplary information taxonomy of a data store in accord with the present invention. With reference to the preceding example concerning an advertisement for the sale of the 1973 Pontiac Firebird, when the advertisement and its associated meta-information is received by receiver interface 108, the receiver interface 108 adds the advertisement information to the data store 104 as a new item of information. As a result, the meta-information associated with the advertisement ("Pontiac," "Firebird," "1973," "car," the contact information of the seller, and "sale") is incorporated into the taxonomy of the data store 104. The apparatus may also copy the meta-information from the taxonomy entry already in the data store 104 that is the closest match to the newly-added item of information. In application, an item of information may be associated with several entries in the taxonomy each associated with a word or noun corresponding to the meta-information associated with the item of information. In the Pontiac example, the item of information for the advertisement may be associated with each of the entries 204, 208, 212, 216, 228, 232 and 220. Note that not all possible branches of the trees are shown in FIG. 2. The tree may further contain, e.g., a "Pontiac" or "1973" branch extending from the "Sell" root entry. Embodiments of the present invention allow the administrator of the system to organize or edit the taxonomy in any way he or she would like.

As discussed above, the transmitter interface 112 is capable of traversing the items of meta-information and providing the associated items of information to a receiver external to the data store. In one embodiment, when the data store receives an item of information, it further processes the item of information to identify an interconnected item of information and provide the interconnected item of information to a receiver external to the data store. Similarly, the apparatus may also contain a syndication mechanism for receiving information and meta-information from the receiver interface and subsequently providing the received information and meta-information to at least one external receiver utilizing the transmitter interface. These mechanisms may be implemented through software, firmware, hardware, or any other combination thereof. In one embodiment, this syndication device may syndicate only certain items of information based on predetermined rules. The syndication device may also syndicate a particular item that has been requested by the external receiver. Thus, with reference to FIG. 2, where an external receiver would like to receive all advertisements for a 1973 Pontiac Firebird that is on sale in Brooklyn, the transmitter interface will traverse the tree starting at the "Sell" root-entry and continue through the information taxonomy until all keywords have been met—that is, "1973," "Pontiac," "Firebird," and "Brooklyn" In traversing the information taxonomy in this manner, the transmitter interface 112 ends at information taxonomy entry 224 in FIG. 2, having found an entry that is associated with all of the keywords. The transmitter interface 112 then transmits all items of information that are associated with this entry, which includes all advertisements for a 1973 Pontiac Firebird in Brooklyn, to an external receiver. Because the advertisement information is also associated with entries in the higher levels of the taxonomy, the advertisement information would also be sent to an external receiver if information associated with entries 204, 208, 212, 216, 228, or 232 were to be transmitted. As seen in FIG. 2, the structure of the taxonomy entries allows the transmitter to traverse the taxonomy in different paths and still find the desired items of information. Rather than begin the traversing with the keywords "Sell," and then "car" (i.e., traversing from node 204 to node 208), it is possible to find the same items of information by beginning with the keywords "Sell," and then "Brooklyn."

The apparatus of the present invention may further contain a republisher that copies at least part of a first item of information in the data store to a second item of information in the data store based on a predefined rule. This copying may occur automatically upon the addition of the first item of information to the data store. Further, the item of information may be transformed in the process. The items of information may be transformed structurally, for example. Taking the Pontiac advertisement as an example, rather than copy the complete advertisement, the apparatus may simply take the pertinent information such as the price, model, and contact information from the first item of information and copy it to a new item of information associated with another entry in the taxonomy. This allows for the syndication of content by the defining of rules that take received items of information and copy them to a new item of information associated with a transmitter interface 112 for rebroadcast to users or applications subscribed to that new item of information.

The apparatus may further transform such information into a table for easier viewing. Furthermore, multiple car advertisements may be transformed into a table and combined for easier viewing and comparison. In addition, rather than a text file, the information may be placed in a spreadsheet. As seen in this example, some information may simply be redacted or not copied. This is especially beneficial where there is a large amount of information subject to the defined republication rule.

A rule may be triggered, for example, based on the receipt of an item of information from a particular source, upon the receipt of an item of information with a particular destination, or upon the receipt of an item of information with a particular characteristic such as a category of information, a specific keyword or a certain time or date. A rule may be defined by a user or by an administrator of the system. This republisher mechanism allows items of information to be further added to other items of information that are associated with other entries in the taxonomy based simply on a defined rule. The advantage of this operation will become further apparent in the discussion of FIG. 3

Figure 3:
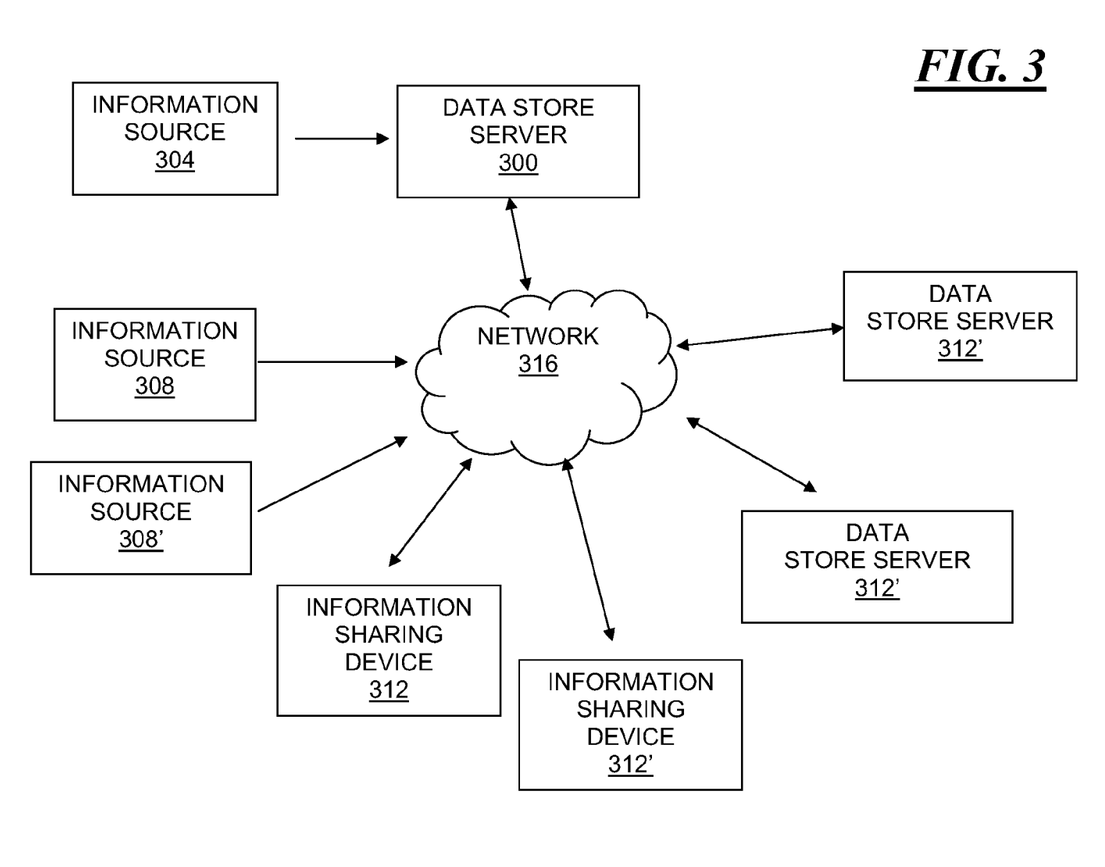
FIG. 3 illustrates an interconnected network of information sources, data store servers in accord with the present invention, and information sharing devices.

Referring now to FIG. 3, there is shown an embodiment of a data store server 300 that is connected a network 316 containing a plurality of connected information sources 308, 308', information sharing devices 312, 312' and additional data store servers 312, 312'. A data store server 300 may comprise a data store 104, a receiver interface 108 and a transmitter interface 112 as shown in FIG. 1. As discussed above, the receiver interface 108 and transmitter interface 112 may be connected to the network 316 via a network interface.

The connection to the network 316 allows the items in the information store to be transmitted to and received from the other devices on the network 316. Items of information may also be received locally from a local information source 304. The local information source 304 may be an embodiment of the present invention that is connected to the data store server 300 via a data connection separate from the network 316. The data connection may be any connection known to one of ordinary skill in the art that allows information to be transmitted to and from the data store server 300.

Network 316 may be any network or collection of networks that carries data communications including communications from and to network capable devices. Network 316 may comprise, for example, a local area network, a wide area network, or a combination thereof. The network 316 may carry communications from wired and wireless data devices, and may support a wide range of protocols and technologies, including those of the World-Wide Web. Embodiments of the present invention may additionally operate as a multi-protocol gateway among a plurality of messaging systems, thereby providing a single interface to several different kinds of information sources accessible by various, differing protocols. Thus, the devices shown in FIG. 3 may be able to communicate with each other on network 316 even where the devices' network protocol systems differ.

Network 316 connects a plurality of connected information sources 308, 308', information sharing devices 312, 312' and additional data store servers 312, 312'. As such, the data store server 300 may communicate with any number of devices connected to network 316 and vice versa. As a result, any number of devices connected to network 316 may communicate with any other number of devices also connected to network 316. Information sources 308, 308' may transmit items of information to any one of data store 300, 312, 312' that is connected to network 316. Unlike the other types of devices on network 316, information sources 208, 208' operate to provide information to data stores 300, 312, 312'. As such, the sources 308, 308' typically do not contain a data store 104 or receiver interface 108 of their own. An information source 308 may be, for example, an automated weather station that transmits temperature information. Another information source 308 may be, e.g., a source of stock market price data.

In contrast to information sources 308, information sharing devices 312, 312' may comprise their own data store 104, receiver interface 108, and transmitter interface 112. These devices 312 may keep a smaller amount of information in its data store, relative to dedicated data store servers 300. Using the receiver interface 108, devices 312 may receive items of information from other devices 312' via those devices' syndication mechanisms or transmitter interfaces 112. Using its transmitter interface 112, a device 312 may also be able to syndicate its own information to other devices 312 on the network 316. Further, using permissions, a device 312 may broadcast the availability of information in its data store 104 to other devices on the network 316.

Because the information sharing device 312 may be an embodiment of the present invention, it may have a viewing screen and a keyboard as a receiver interface. The sharing devices 312, 312' may be used to view items of information stored at data store server 300, 312, 312'. A device 312, for example, may search and view any item of information at data store server 300 based on an implicit or explicit query defined by the user of information sharing device 312, such as a request for information concerning an offer to sell a 1973

Pontiac Firebird. A device 312 may continue to receive additional related items of information on a push or pull basis by defining queries for a republisher mechanism to associate with the device 312. The sharing devices 312, 312' may also interact with the data store server 300, 312, 312' to retrieve a particular item of information via the device's 312 receiver interface for display at the sharing device 312. The user of the information sharing device 312 may be notified upon the receipt of a new item of information.

Figure 4:
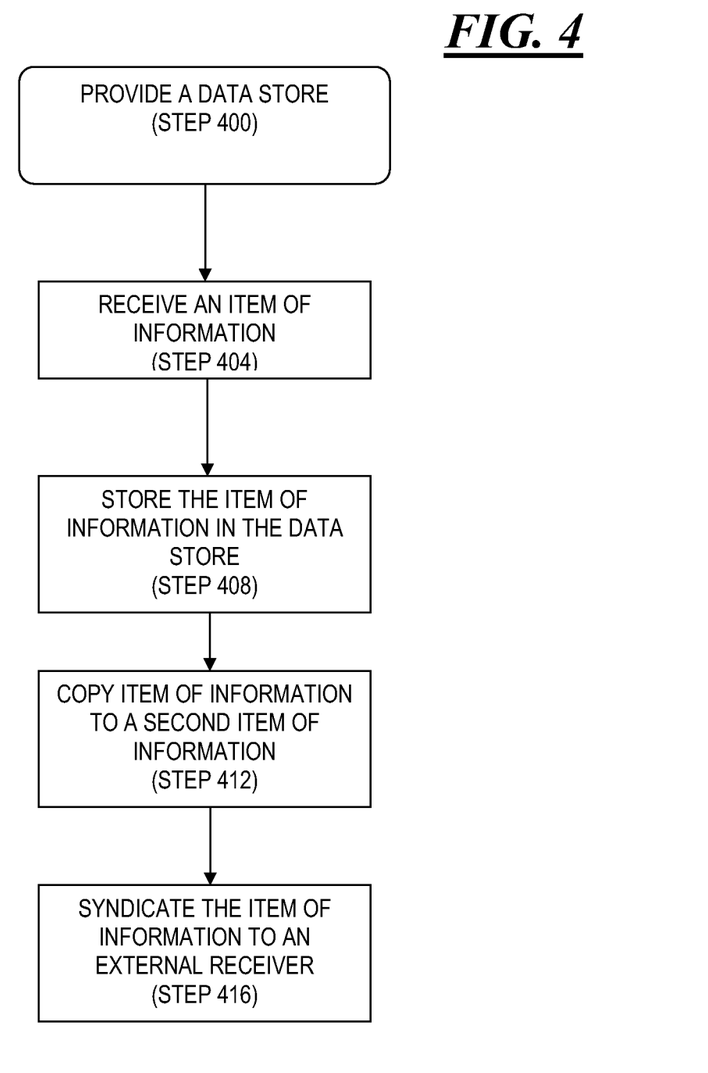
FIG. 4 presents an embodiment of a method for organizing information in accord with the present invention.

Referring now to FIG. 4, a flowchart of one embodiment of a method for information organization and exchange is shown. In this method, a data store is provided (step 400). The provided data store comprises a plurality of interconnected items of information. Items of information may be text, data, video, audio, and even executable programs. Each item of information in the data store may optionally be associated with at least one permission, which may determine whether the item of information is available publicly, is available by invite-only, or is private. The data store may contain a wide range of information or may be particularly focused on a particular category or type of information. For example, one data store may contain the information available on the World Wide Web, while another data store may simply contain a user's homework, class schedule, and interests. Thus, in various embodiments, multiple data stores may be provided. Each data store, though separate, may operate with one another. An item of information in one data store, for example, may be interconnected with another item of information in a different data store. This allows items of information to be both categorically or securely separated, but still shared where appropriate. It also allows information between data stores to be shared and replicated.

Further, each item of information in a data store is associated with at least one item of meta-information. This meta-information may also be stored in the data store. The meta-information may describe the item of information in the data store such as its time and date of creation, the creator or author of the item of information, the source of the item of the information, the means of creation of the item of information, or any standards applicable to the item of information. In addition, meta-information may also describe the purpose or category of the item of information. The meta-information may be associated with the items of information automatically upon the entry of the item of information into the data store. For example, the data store may have the capability to identify important meta-information associated with each item of information based on the content of the item of information, the meta-information associated with similar items of information, predetermined programming, predetermined rules, or any other techniques known by one of ordinary skill in the art to determine the meta-information associated with an item of information. In addition, the item of information may also be manually associated with meta-information.

The interconnected items of information in the provided data store collectively form an information taxonomy where the root entries in the taxonomy are associated with verbs while the lower level entries in the taxonomy are associated with descriptors or nouns. These lower level entries are connected to higher level entries in the taxonomy and, optionally, to other lower level entries. In some embodiments, the lower level entries in the taxonomy are associated with nouns while even lower level of entries in the taxonomy is associated with descriptors.

With reference again to FIG. 4, an item of information is received that is associated with at least one item of meta information (step 404) after the data store is provided (step 400). The item of information is then stored in the data store (store 408). When this occurs, the information taxonomy at the data store is updated such that the meta-information associated with the added item of information is incorporated into the data store 104's taxonomy. Associations between existing entries in the taxonomy may be updated based on the newly added item of information. The added item of information may also be copied to preexisting entries in the taxonomy corresponding to its associated meta-information.

When an item of information is added to the data store (step 408), a plurality of actions may take place. For example, the item of information may be processed to identify an associated item of information and the associated item may then provided to a receiver external to the data store. In another embodiment, after an item of information is added to the data store (step 408), the received information and associated meta-information are syndicated to an external receiver. In the embodiment shown in FIG. 4, after an item of information is stored in the data store, at least part of the item of information may also be copied to a second item of information based on a predefined rule (step 412). This step may occur automatically upon the addition of the item of information to the data store (step 408). This step of copying may also transform the items of information in the process of copying. This change of information may include changing the format, the content, or the structure of the item of information.

For example, in copying a first item of information to a second item of information, a text file may be changed to a spreadsheet file. Further, some information that was originally in the item of information may be deleted. Alternatively, additional information from a second source may incorporated into the copied item of information. Finally, the structure of the item of information may change. For example, a newspaper article may be changed to be in outline form or a car sales advertisement may be changed to be a table listing the price, model, and contact information. The ability to transform information is especially beneficial where there is a large amount of information in a particular item.

The predetermined rule may be triggered based on the receipt of an item of information from a particular source, upon the receipt of an item of information with a particular destination, or upon the receipt of an item of information with a particular characteristic. Examples of particular characteristics may include a category of information, a specific keyword or a certain time and/or date. In addition, the rule may be defined by the users or the administrator of the system and may be entered at the apparatus or remotely.

In certain embodiments, users may interact with a data store in accord with the present invention utilizing a web-based front end. The front end allows users to define rules that create a syndicated feed from the interconnected items of information in the data store that can be updated in real-time as new items are added to the data store that satisfy the rules. The web-based front end can also be used to associate a unique Uniform Resource Locator (URL) with each syndicated feed. A web-based front end can also be used to add items of information to a data store, optionally restricting access to the data store using permissions, as discussed above. These new items of information can utilize the data fields in existing items of information or they can utilize additional data fields. The web-based front end can provide these services without charge or with charge, on a per-feed/per-application basis. A web-based front end can also include portal functionality, providing links or access to third-party applications that interoperate with the data store as described above.

Figure 5:
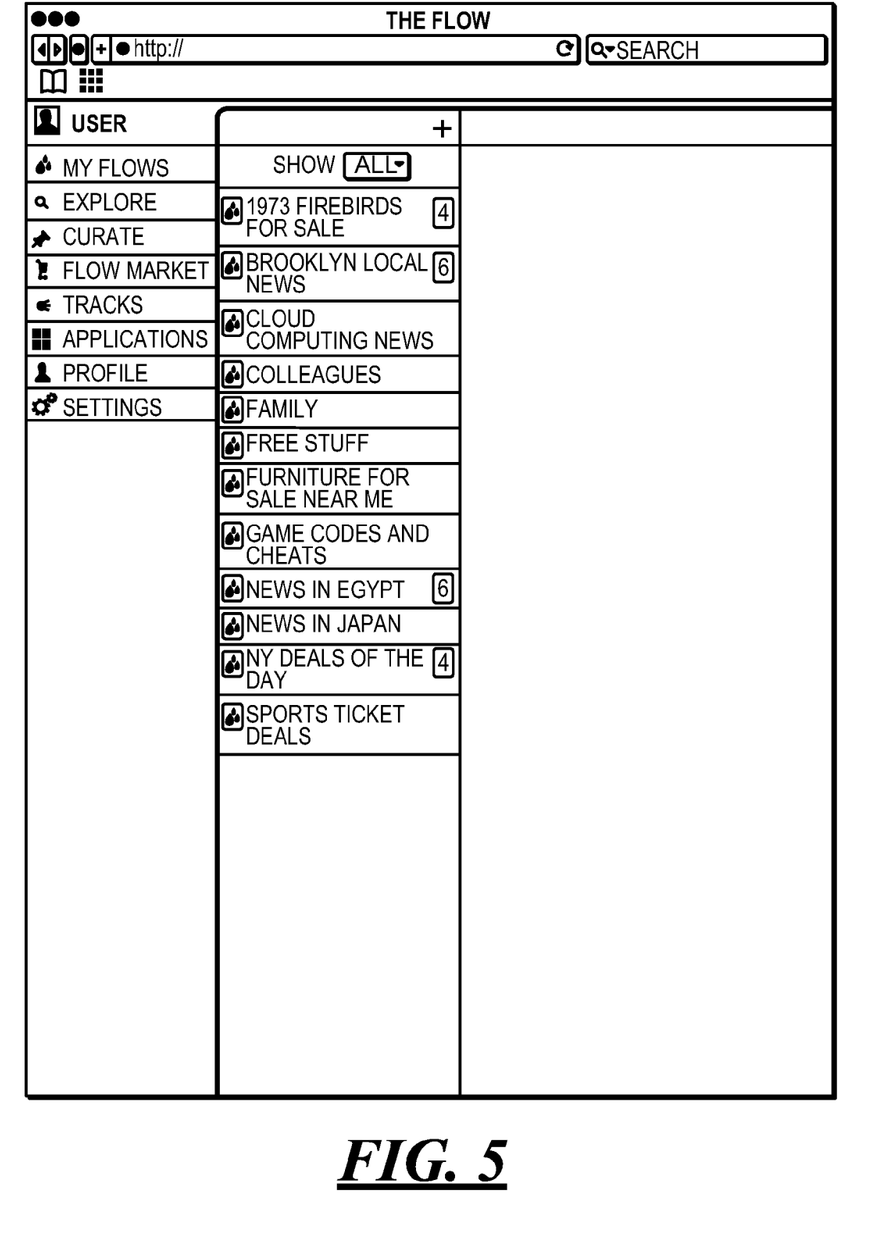
FIGS. 5 and 6 depict screenshots of a user navigating a web-based front end.
Figure 6:
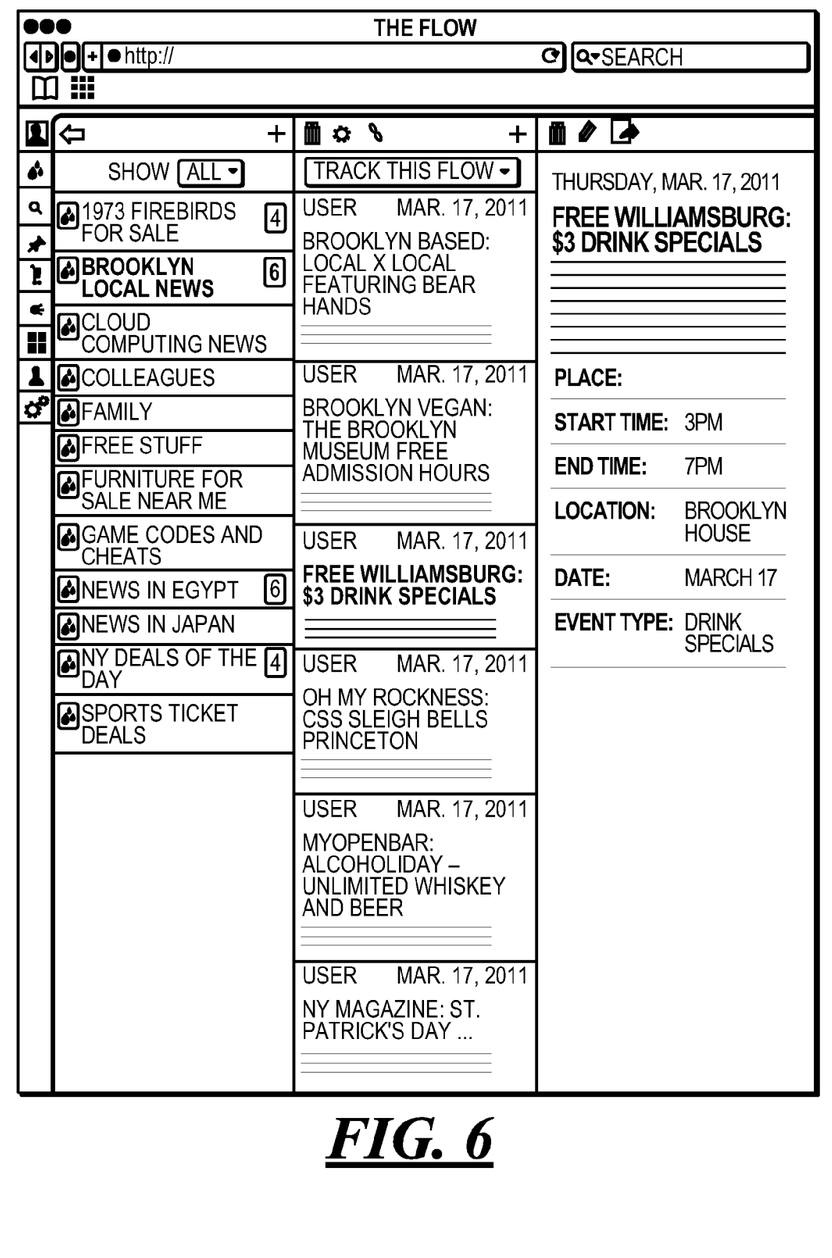

FIGS. 5 and 6 depict screenshots of a user navigating a web-based front end. FIG. 5 shows a user accessing their personal set of syndicated feeds. FIG. 6 shows all of the items of information associated with a particular syndicated feed (i.e., "Brooklyn Local Events"), as the contents of a particular item of information having previously defined fields (i.e., "Start Time", "End Time", etc.).

In another embodiment, application developers can discover other applications that are using the same or similar syndicated data feeds. If an application developer exposes his data structures, other developers can leverage that application's data while adding additional application functionality. For example, an application that offers restaurant coupons can utilize an application that rates restaurants by offering end-users a relevant coupon every time they rate a restaurant. Another application may come along and offer restaurants a way to track coupon usage, leveraging data from the second application.

Figure 7:
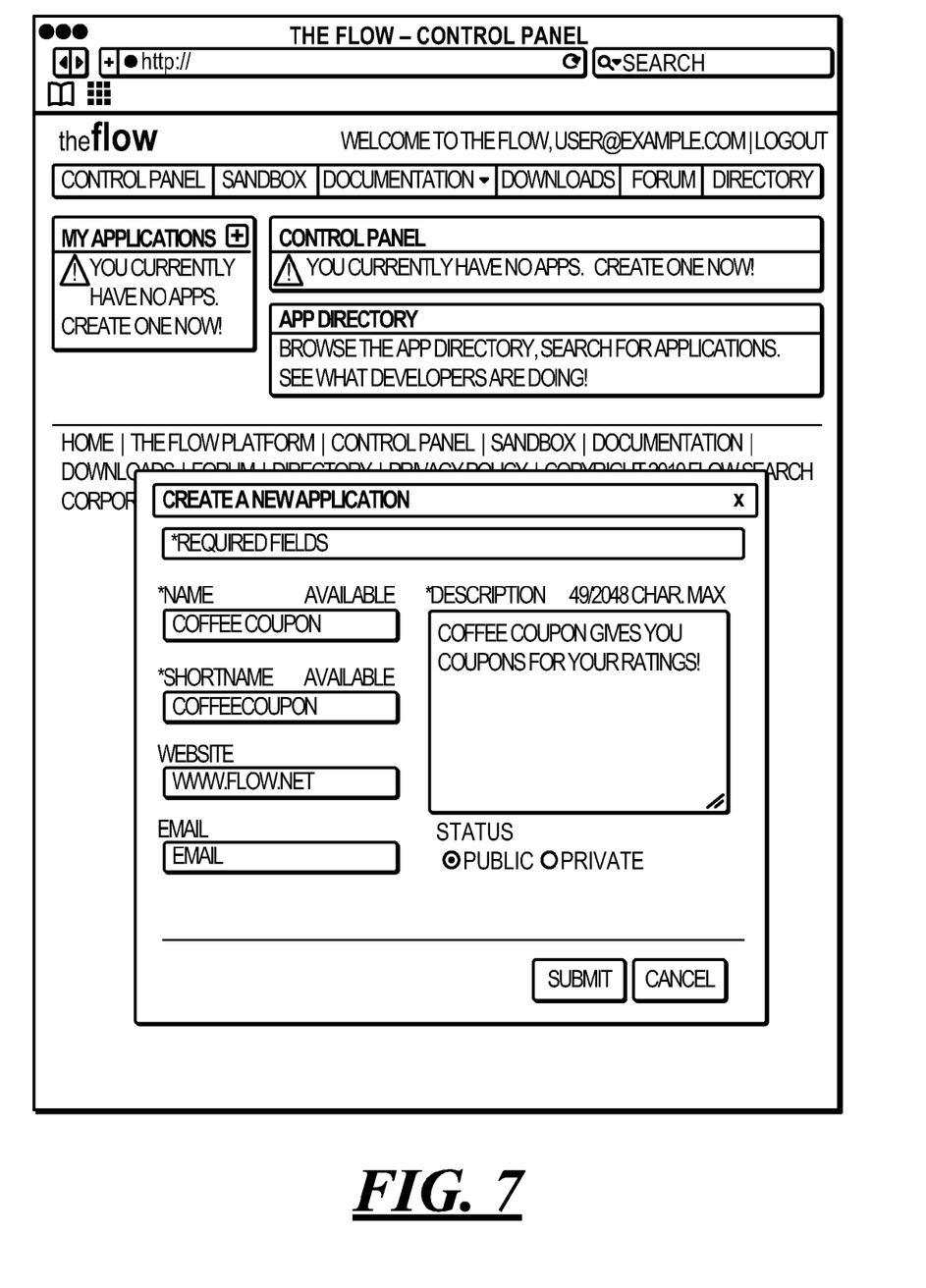
FIGS. 7 and 8 present screenshots of a developer constructing an application utilizing data exposed by another application.
Figure 8:
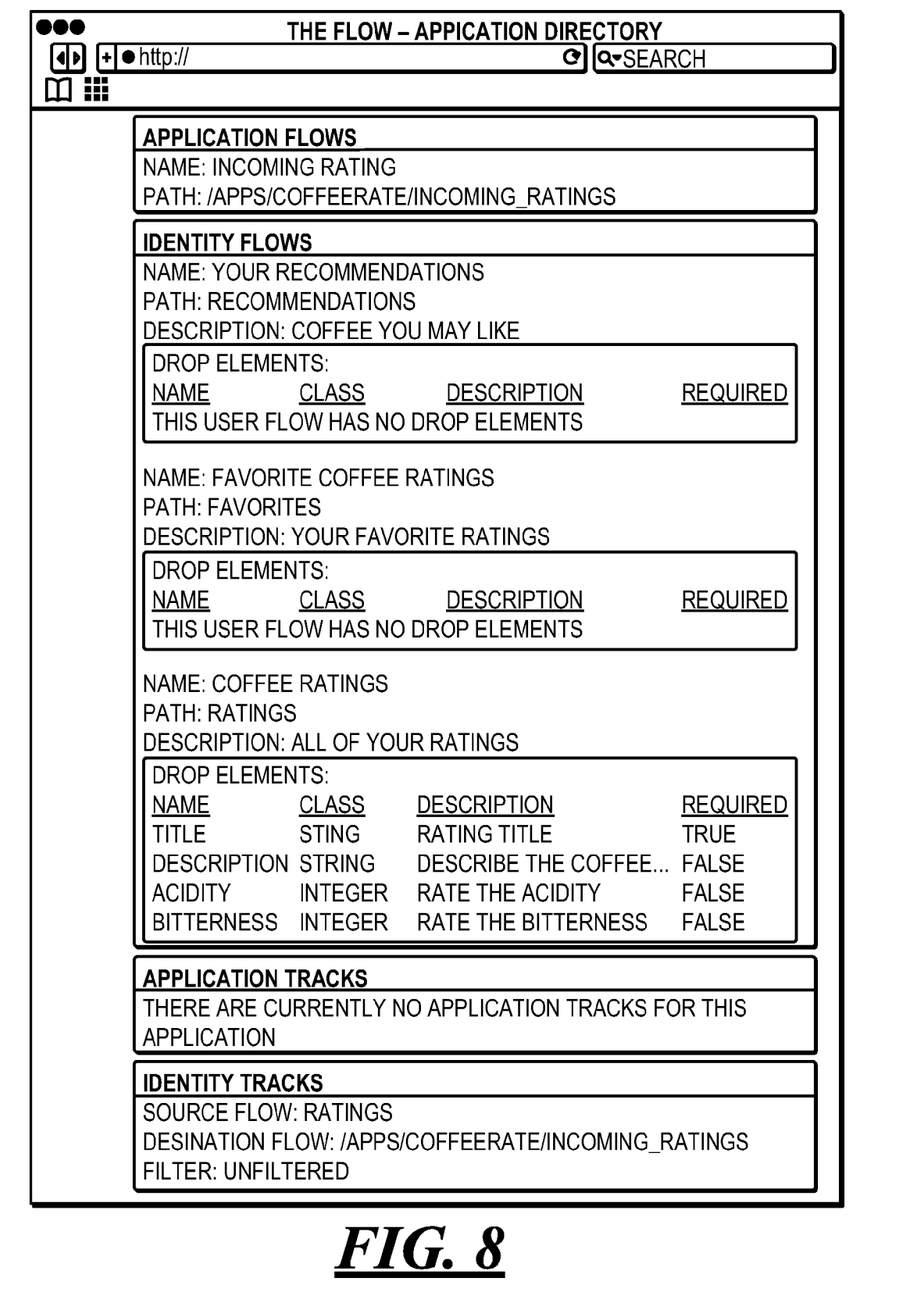

FIGS. 7 and 8 illustrate a developer constructing an application utilizing data exposed by another application. FIG. 7 shows a developer assembling an application that will distribute coupons to end users for coffee purchases. FIG. 8 shows the developer incorporating several publicly-accessible syndicated feeds (i.e., "Coffee Ratings", etc.).

It will therefore be seen that the foregoing represents a highly advantageous approach for information organization and exchange. The terms and expressions employed herein are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. An apparatus for organizing information, the apparatus comprising:
    a data store comprising a plurality of interconnected items of information, each item of information associated with at least one item of meta-information, wherein the items of information form a taxonomy, with root entries in the taxonomy comprising action verbs and lower level entries in the taxonomy comprising descriptors or nouns associated with higher level entries in the taxonomy;
    a receiver interface, the receiver interface for receiving at least one item of information associated with at least one item of meta-information and adding the received item of information to the data store;
    a transmitter interface, the transmitter interface for traversing items of meta-information and providing associated items of information to a receiver external to the data store;
    a republisher, the republisher for copying at least part of a source item of information in the data store to a target item of information in the data store upon the addition of the source item of information to the data store, and for transforming at least one of the format, the content, and the structure of the information in the course of copying the information; and
    a user interface, the user interface for facilitating filtering the interconnected items of information in the data store based on a desired action of a user with respect to the descriptors or nouns of the lower level entries, the action comprising one of the action verbs,
        wherein the data store further processes the received item of information to identify an associated one of the interconnected items of information existing in the data store, and provides the associated interconnected item to a receiver external to the data store, and
        wherein at least one of the items of information is associated with at least one permission restricting whether the item of information may be transmitted from the data store to an external receiver.

2. The apparatus of claim 1 further comprising a syndication mechanism for receiving information and meta-information from the receiver interface and subsequently providing the received information and meta-information to at least one external receiver utilizing the transmitter interface.

3. The apparatus of claim 1, wherein the republisher copies the information to the target item of information based on a predefined rule.

4. The apparatus of claim 3, wherein the predefined rule includes at least one criterion selected from the group consisting of a source location, a destination location, and a characteristic for testing the information.

5. The apparatus of claim 1 further comprising at least one additional data store comprising a plurality of interconnected items of information, each item of information associated with at least one item of meta-information.

6. The apparatus of claim 5 wherein at least one item of information in the data store is connected with at least one item of information in at least one additional data store.

7. The apparatus of claim 1 wherein the receiver external to the data store is an application.

8. The apparatus of claim 1 wherein the receiver external to the data store makes the information received thereby available to a second receiver external to the data store.

9. A method for organizing information, the method comprising:
    providing a data store comprising a plurality of interconnected items of information, each item of information associated with at least one item of meta-information, wherein the plurality of items forms a taxonomy, with root entries in the taxonomy comprising action verbs and lower level entries in the taxonomy comprising descriptors or nouns associated with higher level entries in the taxonomy;
    receiving at least one item of information associated with at least one item of meta-information;
    storing the received information and meta-information in the data store;
    copying at least part of a source item of information in the data store to a target item of information in the data store upon the addition of the source item of information to the data store;
    transforming at least one of the format, the content, and the structure of the information in the course of copying the information;
    filtering the interconnected items of information in the data store based on a desired action of a user with respect to the descriptors or nouns of the lower level entries, the action comprising one of the action verbs; and
    processing the received item of information to identify an associated one of the items of information existing in the data store, and providing the associated item to a receiver external to the data store,
    wherein at least one of the items of information is associated with at least one permission restricting whether the item of information may be transmitted from the data store to an external receiver.

10. The method of claim 9 wherein the receiver external to the data store is an application.

11. The method of claim 10 wherein the receiver external to the data store makes the information received thereby available to a second receiver external to the data store.

12. The method of claim 9 further comprising syndicating received information and meta-information to at least one external receiver.

13. The method of claim 9, wherein the information is copied to the target item of information based on a predefined rule.

14. The method of claim 13, wherein the predefined rule includes at least one criterion selected from the group consisting of a source location, a destination location, and a characteristic for testing the information.

15. The method of claim 9 further comprising providing at least one additional data store comprising a plurality of interconnected items of information, each item of information associated with at least one item of meta-information.

16. The method of claim 15 wherein at least one item of information in the data store is connected with at least one item of information in at least one additional data store.

* * * * *